United States Patent
Beyabani

(10) Patent No.: US 9,438,860 B2
(45) Date of Patent: Sep. 6, 2016

(54) METHOD AND SYSTEM FOR FILTERING ADVERTISEMENTS IN A MEDIA STREAM

(75) Inventor: Syed Zafar Beyabani, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1239 days.

(21) Appl. No.: 11/768,216

(22) Filed: Jun. 26, 2007

(65) Prior Publication Data

US 2009/0007195 A1 Jan. 1, 2009

(51) Int. Cl.
*H04N 7/16* (2011.01)
*H04N 21/44* (2011.01)
*H04N 21/458* (2011.01)
*H04N 21/466* (2011.01)
*H04N 21/475* (2011.01)
*H04N 21/845* (2011.01)

(52) U.S. Cl.
CPC ........ *H04N 7/163* (2013.01); *H04N 21/44008* (2013.01); *H04N 21/458* (2013.01); *H04N 21/4663* (2013.01); *H04N 21/4756* (2013.01); *H04N 21/8456* (2013.01)

(58) Field of Classification Search
USPC .......... 725/19, 32, 37, 44, 46–47, 52, 61, 74
See application file for complete search history.

(56) References Cited

U.S. PATENT DOCUMENTS

| 5,892,536 | A | * | 4/1999 | Logan et al. ................... 725/34 |
| 6,366,296 | B1 | * | 4/2002 | Boreczky et al. ............. 715/719 |
| 2003/0066068 | A1 | * | 4/2003 | Gutta et al. ........................ 725/9 |
| 2003/0093790 | A1 | * | 5/2003 | Logan et al. ................... 725/38 |
| 2003/0101104 | A1 | * | 5/2003 | Dimitrova et al. ............. 705/27 |
| 2003/0131355 | A1 | * | 7/2003 | Berenson et al. .............. 725/46 |
| 2006/0130098 | A1 | * | 6/2006 | Rao et al. ........................ 725/53 |

* cited by examiner

*Primary Examiner* — Hunter B Lonsberry
*Assistant Examiner* — Michael Telan

(57) ABSTRACT

A system and method may include receiving a media stream via a media delivery network, the media stream comprising a plurality of media segments, measuring a plurality of characteristics of a media segment of the plurality of media segments, and assigning a characteristics score to each of the plurality of characteristics. The system and method may further include applying a filter to the media segment to generate a media segment score based on the characteristics scores and to compare the media segment score with a threshold, and outputting a filtered media stream from the filter.

17 Claims, 6 Drawing Sheets

300

Tracking Options

Threshold Setting 0    40    100

Aggressively Flag Ads    Conservatively Flag Ads

Retain data for [30 ▲▼] days.

☑ For recorded shows, retain data until media deleted.

Enable Filtering for

☑ Recorded TV shows.

☑ Paused Live TV shows.

☐ Other Media Content (Internet, videos, etc.).

METHOD AND SYSTEM FOR FILTERING ADVERTISEMENTS IN A MEDIA STREAM

BACKGROUND INFORMATION

Many advertisers use television to advertise their products and services. Some viewers, however, feel bombarded and may avoid watching advertisements broadcast in television programs or may watch television programs having fewer or no commercials (e.g., HBO). Viewers have adopted strategies to avoid watching advertisements in a television program, such as leaving the room, changing channels, and deleting commercials using digital video recorders. These strategies are not satisfactory for many reasons.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A system and method may include receiving a media stream via a media delivery network, the media stream comprising a plurality of media segments, processing a plurality of characteristics of a media segment of the plurality of media segments, and assigning a characteristics score to each of the plurality of characteristics. The system and method may further include applying a filter to the media segment to generate a media segment score based on the characteristics scores and to compare the media segment score with a threshold, and outputting a filtered media stream from the filter.

The description below describes servers, set top boxes, presentation devices, and network elements that may include one or more modules, some of which are explicitly shown, others are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, network elements, media providers, media storage servers, etc.) separately. The functions described as being performed at various components may be performed at other components, and the various components may be combined and/or separated. Other modifications also may be made.

Figure 1:
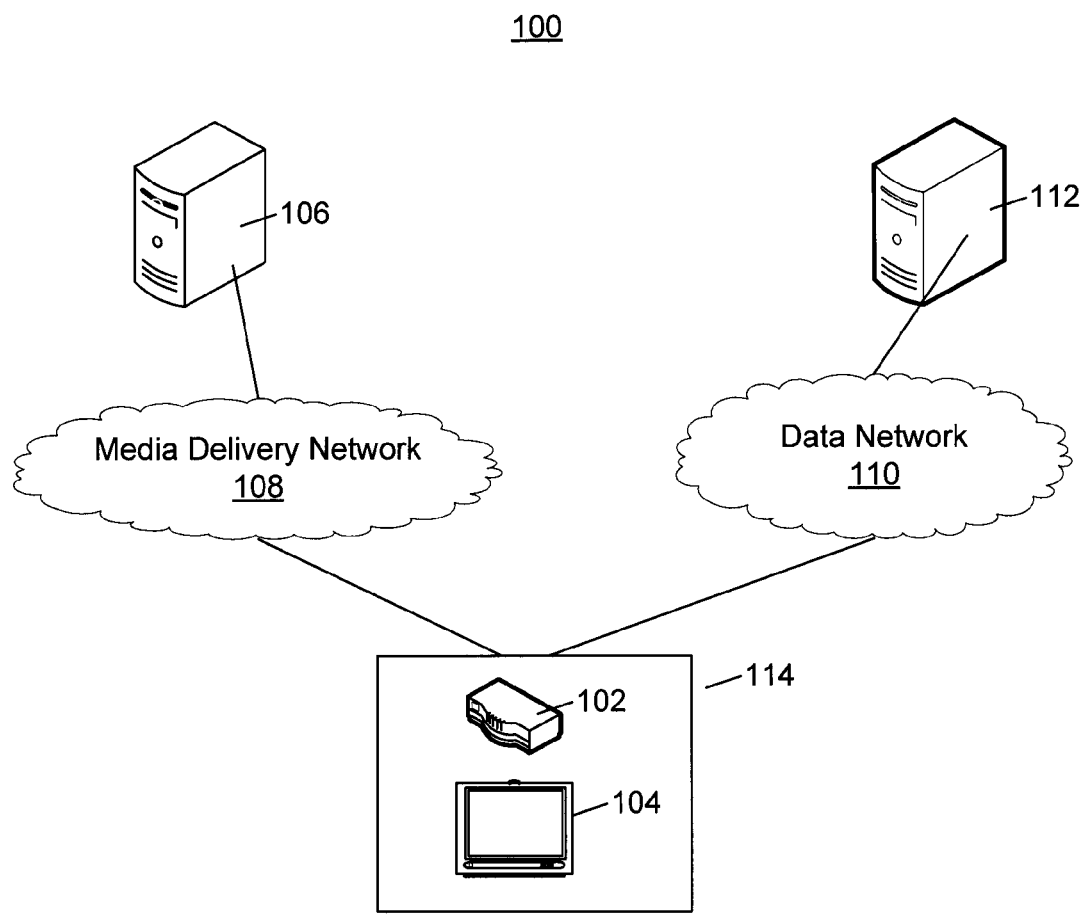
FIG. 1 illustrates a system in accordance with exemplary embodiments.

FIG. 1 illustrates a system in accordance with exemplary embodiments. The system 100 may filter a media stream to remove media segments from the media stream identified as having characteristics similar to advertisements. The system 100 may examine various characteristics of each media stream to generate characteristics scores for each of the media segments. The system 100 may filter the media segments based on the characteristics scores to determine whether the characteristics of the media segment meet or exceed a threshold. The system 100 may predict that media segments not meeting or exceeding the threshold are advertisements, and may remove these media segments from the media stream, as will be discussed in greater detail below.

In an exemplary embodiment, the system 100 may include a set top box 102, a presentation device 104, a media provider 106, a media delivery network 108, a data network 110, a media storage server 112, and a customer premises 114. It is noted that system 100 illustrates a simplified view of a media delivery system, and other hardware devices and software not depicted may be included in the system 100. It is also noted that the system 100 illustrates only a single set top box 102, a single presentation device 104, a single media provider 106, a single media delivery network 108, a single data network 110, a single media storage server 112, and a single customer premises 114. It will be appreciated that multiple instances of these devices may be used. Moreover, the system 100 may include other devices not depicted in FIG. 1.

The media provider 106 may broadcast a media stream to the set top box 102 at the customer premises 114 via the media delivery network 108. The media provider 106 may be, for example, a cable company that broadcasts a cable television signal over the media delivery network 108. The media delivery network 108 may be a wired network, a wireless network, or a combinations thereof. For example, the media delivery network 108 may deliver the media stream via a satellite network, a cable television network, an antenna, an optical fiber, a coaxial cable, or other manners of transporting a media stream.

The media stream may be an analog or digital signal that includes audio, video, text, and/or combinations thereof. The media stream may be, for example, a cable television signal, or may be digitized audio, video, text, etc., transported across a computer network (e.g., transported in Internet Protocol packets via the Internet). The media stream also may include multiple different channels (e.g., different television channels).

The media stream may include a number of media segments, some of which may include content media segments, others of which may include advertisement media segment. Each media segment may have a varying duration. Content media segments may be media segments in the media stream that contain characteristics that are not predicted to be advertisements. Advertisement media segments may be media segments in the media stream that contain characteristics that are predicted to be advertisements. A further discussion of predicting whether a media segment is a content media segment or is an advertisement media segment is provided below. Content media segments may be, for example, part of a television program. Advertisement media segments may be, for example, an advertisement included in a television program. For example, in a thirty minute block of time, the media provider 106 may broadcast via the media delivery network 108 twenty minutes of content media segments for displaying a television program and ten minutes of advertisement media segments for displaying one or more advertisements.

The set top box 102 may receive and process the media stream from the media provider 106. A viewer may use an input device, such as, but not limited to, a remote control, to cause the set top box 102 to tune to a particular channel of the media stream for displaying the content on that particular channel at the presentation device 104, as is well known. The presentation device 104 may be a television set, a computer monitor, or other devices that may display video, text, audio, and/or combinations thereof. It is noted that FIG. 1 depicts the set top box 102 and the presentation device 104 as being separate devices. The set top box 102 and the presentation device 104, however, may be combined into a single device.

The set top box 102 may apply a filter to the media stream to generate a filtered media stream and may cause display of the filtered media stream at the presentation device 104. The set top box 102 may filter the media stream to remove media segments based on predicting which of the media segments have characteristics similar to advertisements (i.e., advertisement media segments) and removing the advertisement media segments from the media stream. Filtering of the media stream will be discussed in further detail below. In addition to filtering, the set top box 102 may report information about individual viewers to the media storage server 112 via the data network 110. For example, the set top box 102 may forward information on preferences of individual viewers, metadata from a media table, filtering preferences, combinations thereof, and/or other data collected about the viewer. The data network 110 may be a wired network, a wireless network, or a combined wired and wireless network for transporting information in digital or analog form from the set top box 102 to the media storage server 112. It is noted that the media delivery network 108 and the data network 110 may be a single network, may be two separate networks, as shown in FIG. 1, or may be more than two networks.

The media storage server 112 may analyze individual viewer preferences and may aggregate information on the viewers. The media storage server 112 may present the aggregate information to advertisers and/or other entities interested in targeted marketing of particular viewers and/or analyzing aggregate data. The information on individual viewer preferences may be derived from feedback received from the viewers at the set top box 102, as will be discussed in further detail below.

Figure 2:
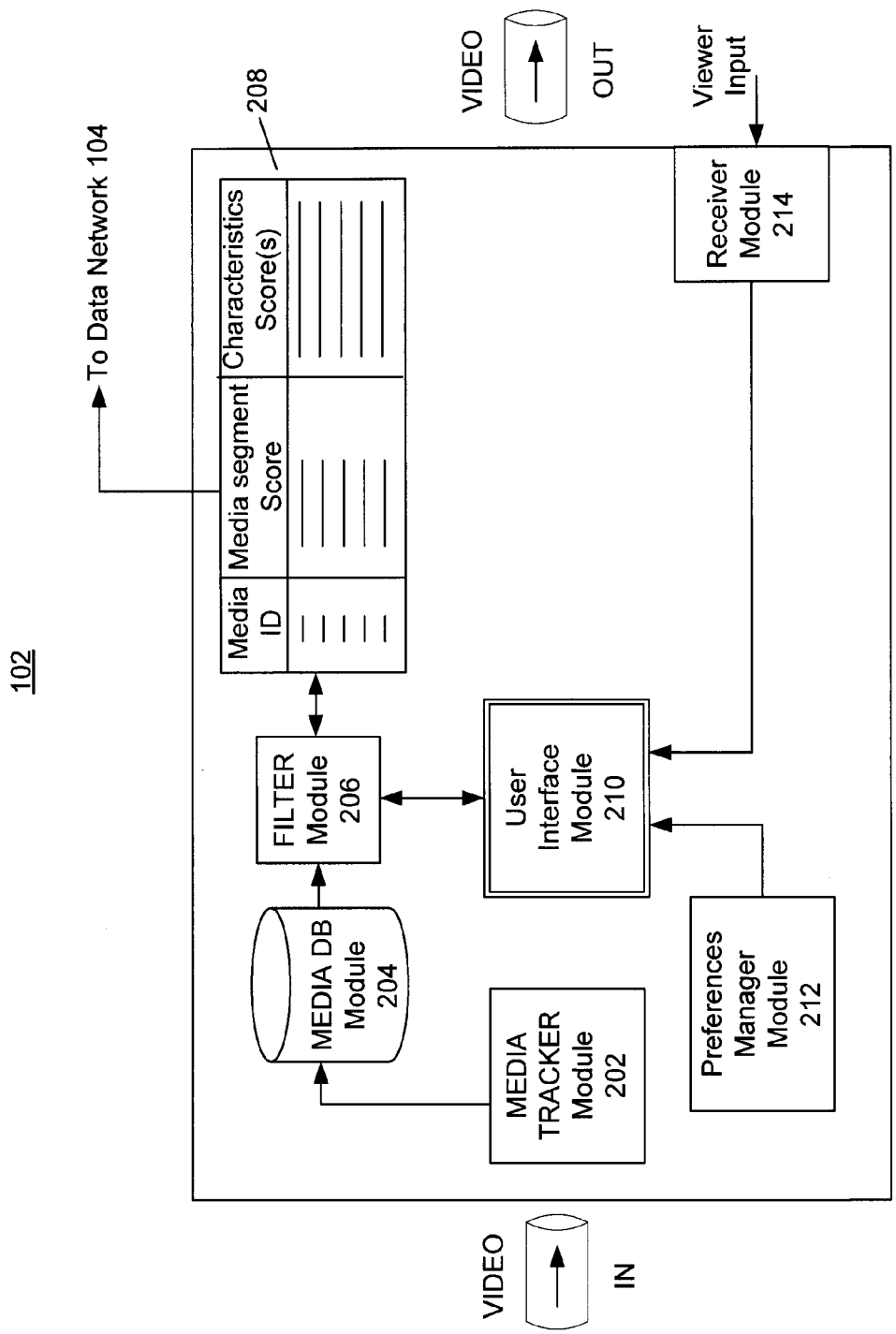
FIG. 2 illustrates various modules of a set top box for filtering a media stream in accordance with exemplary embodiments.

FIG. 2 illustrates various modules of a set top box for filtering a media stream in accordance with exemplary embodiments. The set top box 102 may examine various characteristics of each media segment in the media stream and may assign a characteristics score to each characteristic of the media segment. The set top box 102 may apply a filter to the media stream to generate a media segment score based on the characteristics scores for each media segment, and may remove media segments having media segment scores that do not meet or exceed a threshold. The set top box 102 may predict that media segments having media segment scores that fail to meet or exceed the threshold are advertisement media segments. The set top box 102 may process the non-correlated characteristics of the media segments to effectively predict whether a media segment is an advertisement.

In an exemplary embodiment, the set top box 102 may include a media tracker module 202, a media database module 204, a filter module 206, a media table module 208, a user interface module 210, a preferences manager module 212, and a receiver module 214. It is noted that the modules 202, 204, 206, 208, 210, 212, and 214 are exemplary and the functions performed by one or more of the modules may be combined with that performed by other modules. The functions described herein as being performed by the modules 202, 204, 206, 208, 210, 212, and 214 also may be separated and may be performed by other modules at devices local or remote to the set top box 102.

The media tracker module 202 of the set top box 102 may process a media stream received via the media delivery network 108. The media tracker module 202 may process various characteristics of each media segment in the media stream for use in assigning a characteristics score to each of the characteristics. The characteristics of the media segment may include one or more of: (1) whether a blank media segment immediately preceded the media segment being processed; (2) whether the media segment includes a call sign; (3) whether the media segment includes closed captioning (CC) text; (4) audio traits of the media segment (e.g., a change in volume from a preceding media segment, maximum volume, etc.); (5) video traits of the media segment (e.g., changes in brightness, colors, scene from a preceding media segment); (5) a time elapsed since the last advertisement media segment; and (6) schedule data from an Electronic Program Guide (EPG), if available. It is noted that the above characteristics are exemplary, and that additional, more, fewer, and/or other characteristics of a media segment may be processed by the media tracker module 202.

The media tracker module 202 may generate a characteristics score for each of the characteristics of the media segment. The characteristics score may be a binary score (e.g., a one or a zero, a low number or a high number, etc.) indicating the presence or absence of a particular characteristic. A non-zero binary score may indicate that the characteristic is present within the media segment, and a zero binary score may indicate that the characteristic is absent from the media segment.

The following describes an exemplary embodiment of generating characteristics scores for the characteristics of media segments in a media stream. The media tracker module 202 may assign a non-zero binary score when a blank media segment immediately precedes the media segment being measured, and a zero binary score when it does not. The media tracker module 202 may assign a non-zero binary score when the media segment being measured does not include a call sign, and a zero binary score when it does. The media tracker module 202 may assign a non-zero binary score when the media segment does not include closed captioning (CC) text, and a zero binary score when it does. The media tracker module 202 may assign a non-zero binary score when a volume of the media segment is at or near a maximum volume level permitted by the Federal Communication Commission (FCC) or other regulating body, and a zero binary score when it is not.

The media tracker module 202 may assign a non-zero binary score when the video traits of the media segment being measured change by more than a certain amount from the immediately preceding media segment, and a zero binary score when it does not. For example, the media tracker module 202 may examine changes in brightness, colors, or scene from a preceding media segment. In an exemplary embodiment, the media tracker module 202 may assign the media segment a brightness score and/or a color score. The brightness score may correspond to a measurement of how bright the media segment is over a range (e.g., from one to one hundred). The media tracker module 202 may compare the brightness score of the preceding media segment with the brightness score of the current media segment to determine if the brightness scores differ by more than a certain amount, which may be a percentage of the maximum value in the range (e.g., ten percent of one hundred). For example, a preceding media segment may have a brightness score of thirty five, and if the change in the brightness score is greater than ten percent of the one hundred (i.e., less than fifteen or greater than thirty five), the media tracker module 202 may assign a non-zero binary score indicating that the video traits of the media segment being measured have changed more than a certain amount from the immediately preceding media segment, and a zero binary score when it does not. The media tracker module 202 may assign the color score similarly to the brightness score described above, where the colors of the media segments are assigned a score within a range based on how prevalent the color is within the media segment and the media tracker module 202 may determine if the color scores differ by more than a certain amount.

The media tracker module 202 may assign a non-zero binary score when a time elapsed since the last advertisement media segment is greater than a certain amount of time (e.g., five minutes, fifteen minutes, etc.), and a zero binary score when it does not. The media tracker module 202 may assign a non-zero binary score based on analysis of the Electronic Program Guide (EPG). In an exemplary embodiment, the media tracker module 202 may examine the EPG data and identify that an episode of a particular television program is being broadcast today at 9:00 P.M. central standard time. After a certain amount of time (e.g., ten minutes) during which the set top box 102 has received the media stream associated with a television program, but has not identified an advertising media segment within the media stream, the media tracker module 202 may assign a non-zero binary score to the media segment. Prior to the certain amount of time, the set top box 102 may assign a zero binary score to the media segment. The media tracker module 202 also may receive information from the media storage server 112 indicating when a particular television program has historically had commercial breaks. For example, the media tracker module 202 may assign a non-zero binary score to the media segment during time intervals when the television program has historically had commercial breaks (e.g., right before the beginning of the program, ten minutes into the program, at the end of the program, etc.). The media tracker module 202 may process the characteristics scores to identifying a beginning and an ending of a media segment within the media stream.

In an exemplary embodiment, to determine a beginning and an ending of a media segment within the media stream, the media tracker module 202 may sample the media stream at a constant or variable sampling rate (e.g., once every second, ten seconds, etc.) as the media stream is received from the media provider 106. The media tracker module 202 may consider a portion of the media stream to be part of the same media segment so long as the characteristics scores for the characteristics of the media stream do not vary beyond a certain amount. In an exemplary embodiment, the media tracker module 202 may sum the characteristics scores, and as long as the total of the characteristics scores does not vary by more than a certain amount (e.g., by more than ±5 points), the media tracker module 202 may consider the media stream as belonging to the same media segment. When the sum of the characteristics scores varies by more than a certain amount (e.g., ±5 points), the media tracker module 202 may mark the media segment as being a new media segment. In an exemplary embodiment, the media tracker module 202 may create pointers indicating the start and end of each media segment in the media stream. The media tracker module 202 may store the pointers in a media table of the media table module 208, which will be discussed in further detail below, and may associate the pointers with the media segment. Also, the media tracker module 202 may examine headers of digital media stream data (e.g., an Internet Protocol packet header) to identify a beginning and ending of a media segments.

After the beginning of a media segment is identified, the media tracker module 202 may generate a media identification (I.D.) for the media segment. In an exemplary embodiment, the media table module 208 may assign each media segment a unique identification number (e.g., a hash number) as the media I.D. Also, the media table module 208 may identify a media I.D. assigned to the media segment by the media provider 106 included with the media segment in the media stream.

Once the characteristics score(s) are generated, the media tracker module 202 may communicate to a media database module 204 the media I.D. of the media segment being processed, the media segment, and the characteristics scores for each of characteristics of the media segment. After storing the media segment, the media I.D., and the characteristics score(s), the media database module 204 may forward each media segment and the associated characteristics scores to a filter module 206 for filtering of the media stream. The media database module 204 optionally may buffer a certain number of media segments in the media stream before forwarding the media stream to the filter module 206.

Before analyzing the characteristics scores of the media segment, the filter module 206 may determine whether the media stream includes any metadata and may analyze a user profile and media provider characteristics if the media stream includes metadata. If the media stream does not include any metadata, the filter module 206 may skip analyzing the user profile and the media provider characteristics by applying filtering techniques to remove media segments having characteristics that are similar to characteristics of advertisements from the media stream.

The metadata may be information describing the media stream that may or may not be displayed to the viewer. For example, the metadata may be data that includes a rating of a television program, information about a television program (e.g, synopsis, actors, time of broadcast, etc.), information about target viewers (e.g., gender, age, ethnicity, etc., or other demographic information), information describing an advertisement (e.g., product description), and/or combinations thereof.

The set top box 102 may store the user profile, which may include customer specific traits may be, such as, but not limited to, information on a viewer's gender, age (e.g., adult, child, etc.), ethnicity, interests, demographic information, combinations thereof, and/or other information about the viewer. When the filter module 206 identifies metadata in the media stream, the filter module 206 may compare the user profile with the metadata to determine whether the media segment is suitable for the viewer based on the viewer's gender, age group, interests, demographic information, other information about the viewer, etc. If the metadata matches some or all the information included in the user profile, the filter module 206 may include the media segment in the filtered media stream. If the media segment metadata does not match some or all of the information included in the user profile, the filter module 206 may not include the media segment in the filtered media stream. Thus, the filter module 206 may prevent children from seeing inappropriate advertisements and/or programs (e.g., violence, adult material, etc.), men from seeing advertisements targeted for women, etc. This also may permit advertisers to provided targeted delivery of advertisements.

The filter module 206 also may analyze the media provider characteristics when the media stream includes metadata. The media provider characteristics may indicate whether the viewer has signed up for a premium service from the media provider 106. In an exemplary embodiment, the media provider 106 may offer premium viewers (e.g., viewers providing demographic information and preferences) perks such as, but not limited to, allowing the viewer to skip some advertisements or making sure that the viewer does not see the same advertisement repeatedly during a time period (e.g., 30 minutes, one or more hours, one or more days, etc.), in return for the viewer providing demographic information and preferences. For example, the viewer may agree to view a limited number of advertisements in exchange for providing demographic information and preferences to the media provider 106. After the set top box 102 determines that the viewer is a premium viewer, if the filter module 206 detects any metadata associated with a media segment from an Advertiser which participates in this premium-viewer agreement, then the filter module 206 may determine whether the viewer has previously viewed this advertisement during the time period. If the viewer has not viewed the advertisement, the filter module 206 may include the media segment in the filtered media stream and may update a media table of the media table module 108 to indicate that the viewer has viewed this advertisement. The media table may store data about previously processed media segments. If the viewer has previously viewed the advertisement, the filter module 206 may not include the media segment in the filtered media stream.

For media segments that are not associated with metadata, the filter module 206 may compare the characteristics scores of each media segment with characteristics scores of one or more previously processed media segments stored in a media table of the media table module 208. The media table may store a media I.D., a media segment score, and characteristics score(s) for some or all of the previously processed media segments. An example of the media table is depicted in FIG. 2 within the media table module 208. A previously processed media segment may be the media segment that immediately precedes the media segment being processed in the media stream, as well as a media segment that does not immediately precede the media segment being processed. If the filter module 206 identifies a previous media segment in the media table with characteristics scores similar to those of the media segment currently being processed, the filter module 206 may process the current media segment in the same manner in which the previous media segment was processed.

In an exemplary embodiment, if the media table indicates that a previously processed media segment was removed from the media stream that has characteristics scores similar to those of the media segment currently being processed, the filter module 206 may not include the media segment currently being processed within the filtered media stream. If the media table indicates that a previously media segment was not removed from the media stream that has characteristics scores similar to those of the media segment currently being processed, the filter module 206 may include the media segment currently being processed in the filtered media stream.

The filter module 206 may determine that two media segments are to be similarly processed if some or all of the characteristics scores of the two media segments vary from one another by less than a certain amount. In an exemplary embodiment, the filter module 206 may determine that two media segments are similar if the two media segments have the same characteristics scores. Also, the filter module 206 may determine that two media segments are similar based on comparing a media segment score of each of the two media segments. The media segment score will be discussed in further detail below. The filter module 206 may determine that the two media segments are similar if the media segment scores differ by less than a certain amount. In an exemplary embodiment, the media segment scores may range from a low number to a high number. The filter module 206 may calculate a percentage of the high number, and may determine that media segment scores falling within the percentage of the high number of each other are similar, and media segment scores outside of the percentage of the high number are not similar. For example, if the high number is one hundred points and the percentage is ten percent, the filter module 206 may determine that media segment scores falling ten points of each other are similar, and media segment scores not within ten points of each other are not similar.

If the filter module 206 identifies that the characteristics scores of the current media segment are not similar to the characteristics scores of any previous media segments stored at the media table of the media table module 208, the filter module 206 may apply a filter to the media segment currently being processed. The filter module 206 may apply a filter that generates a media segment score based on some or all of the characteristics scores of the media segment being processed. The filter module 206 may then use the filter to determine whether the media segment score meets or exceeds a threshold, and may remove any media segments that do not meet or exceed the threshold. In an exemplary embodiment, the filter may be a Bayesian filter.

The media segment score may be the result of a formula that applies numerical weights to some or all of the characteristics scores of the media segment. For example, the media segment score may be an average that gives an equal weighting to all of the characteristics scores. In another example, the media segment score may be a sum of the characteristics scores. In other examples, the media segment score may apply an unequal weighting where certain characteristics scores are given a higher or lower weighting than others. The weights of the formula may be set to an initial value, which may change over time based on feedback from the viewer, as will be discussed in greater detail below. The weights of the formula also may be adjusted based on data received from the media storage server 112.

After generating the media segment score, the filter module 206 may compare the media segment score to a threshold. The threshold may be based on input received from the viewer indicating how aggressive the viewer desires the filter module 206 to filter the media stream for advertisements. If the threshold is not specified by the viewer, the filter module 206 may use a default setting for the threshold. Selecting a threshold will be discussed in further detail below.

If the media segment score meets or exceeds the threshold, the filter module 206 may include the media segment in a filtered media stream for display at the presentation device 104. If the media segment score does not meet or exceed the threshold, the filter module 206 may remove the media segment from the media stream and may not include the media segment in the filtered media stream. In an exemplary embodiment, the media segment score may meet or exceed the threshold if the media score is less than or equal to the threshold. For example, the media segment score may be "30," and the threshold may be "40."

Once generated, the filter module 206 may communicate the characteristics scores and the media segment score of the media segment to the media table module 208 for storage. The media table module 208 may store the characteristics scores and the media segment scores of previously processed media segment, as discussed above. The media table module 208 may update the media table based on feedback received from the viewer and may communicate viewer information to the media storage server 112 via the data network 110. The media storage server 112 may aggregate the viewer information to analyze filtering preferences of the viewer.

To set up filtering of the media stream, the set top box 102 may present a graphical user interface to prompt the viewer for information on how to filter the media stream. The user interface module 210 of the set top box 102 may cause display of a graphical user interface to prompt the viewer to input information to initialize, set up, and/or modify the filter. The user interface module 210 may prompt the viewer to select how aggressively to filter the media stream for advertisements, and how to respond to feedback received from the viewer. In an exemplary embodiment, a receiver module 214 may receive a feedback signal identifying selections of the viewer's preferences and feedback, and a preferences manager module 212 may store the viewer preferences.

Figure 3:
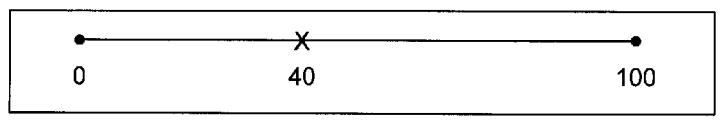
FIG. 3 illustrates a tracking options graphical user interface in accordance with exemplary embodiments.

FIG. 3 illustrates a tracking options graphical user interface in accordance with exemplary embodiments. The user interface module 210 may present the tracking options graphical user interface 300 to prompt the viewer to instruct the filter module 206 how aggressively or conservatively to filter the media stream. In an exemplary embodiment, the tracking options graphical user interface 300 may prompt the viewer to select a threshold for the filter module 206. The viewer may use an input device (e.g., remote control, keyboard, etc.) to select a threshold (e.g., press a number key on a remote control, on a keyboard, etc.). For example, the tracking options graphical user interface 300 may include a scale from zero to one hundred for the threshold. A threshold of zero may instruct the filter module 206 to aggressively flag advertisements (i.e., more likely to identify the media segment as being an advertisement media segment). A threshold of one hundred may instruct the filter module 206 to conservatively flag advertisements (i.e., less likely to identify the media segment as being an advertisement media segment). In the example depicted in FIG. 4, the user has selected a threshold of 40. It is noted that the threshold may correspond to ranges other than between zero and one hundred, and also may include the selections of non-numerical options that may be converted to a numerical thresholds.

The tracking options graphical user interface 300 may prompt the view to instruct the set top box 102 on how long to retain the scores (e.g., characteristics scores, media segment scores) of the media segments in the media table module 208. The length of time may be adjusted based on a number of seconds, minutes, days, weeks, etc. in which the viewer wishes to retain the scores. Additionally, for a viewer who selects to record a media stream (e.g., record a broadcast television show), the tracking options graphical user interface 300 may present the viewer with an option to retain data on the media segments until a recorded media stream is deleted or until no more space is available for storing the media segments in the media database module 204 or in the media table of the media table module 208.

The tracking options graphical user interface 300 may permit the viewer to select for which programs filtering is enabled. In an exemplary embodiment, the tracking options graphical user interface 300 may prompt the viewer to enable filtering for recorded media streams (e.g., recorded TV shows), paused live media streams (e.g., paused live TV shows), other media streams such as, but not limited to, Internet, videos, etc., and/or combinations thereof.

The preferences data entered at the tracking options graphical user interface 300 may be stored by the preferences manager module 212. During filtering, the preferences manager module 212 may communicate the preferences data entered at the tracking options graphical user interface 300 to the filter module 206. The user input module 210 also may cause the presentation device 104 to display a graphical user interface to obtain instructions that instruct the set top box 102 on what to do after detecting an advertisement media segment and what happens after skipping the advertisement media segment.

Figure 4:
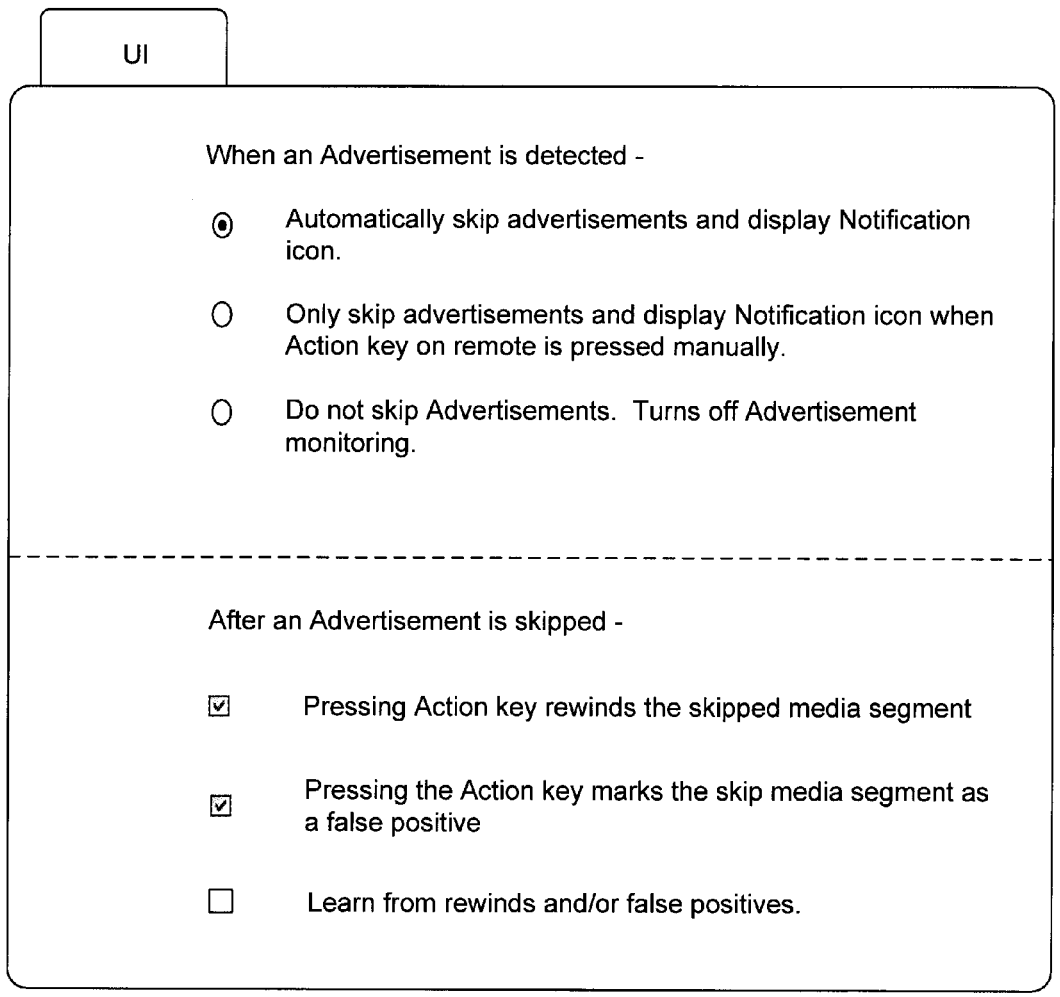
FIG. 4 illustrates a graphical user interface in accordance with exemplary embodiments.

FIG. 4 illustrates a graphical user interface in accordance with exemplary embodiments. The graphical user interface 400 may permit a viewer to specify what happens when an advertisement is detected and also may be used to indicate what happens after an advertisement media segment is skipped. In an exemplary embodiment, the graphical user interface 400 may present the viewer with three options. A first option may permit the user to instruct the set top box 102 to automatically skip advertisement media segments and to cause the presentation device 104 to display of a notification icon each time an advertisement media segment is skipped. The notification icon may inform the viewer that an advertisement media segment has been skipped. For example, the notification icon may be a video overlay that is displayed at the presentation device 104 to indicate that an advertisement segment has been skipped.

In a second option, the viewer may instruct the filter module 206 to display a notification for each media segment the filter module 206 predicts is an advertisement media segment. Selecting the second option may instruct the filter module 206 not to remove the media segment from the media stream unless the viewer presses an action key on a user input device (e.g., a remote control). The action key may be a button on a remote control, keyboard, or the user input device communicatively coupled to the set top box 102. Pressing the action key on the input device may communicate a feedback signal to the set top box 102. For example, a viewer may be watching a television show and may press an action key on a remote control to send a feedback signal to the set top box 102. Pressing the action key may indicate that the viewer agrees with the prediction of the set top box 102 and may instruct the set top box 102 to skip the advertisement media segment. The feedback signal may train the filter module 206 to prevent future instances of the advertisement media segment from being shown. For example, the user interface module 210 may update the media table of the media table module 208 to include a media I.D. for the media segment being displayed when the feedback signal is received and a media segment score that does not exceed the threshold. This may instruct the filter module 206 to remove all instances of the media segment in future media streams, thereby preventing future display of the media segment.

In a third option, the viewer may instruct the set top box 102 not to skip any advertisements. Selecting this option may instruct the filter module 206 not to perform any filtering of the media stream.

The graphical user interface 400 may prompt a viewer to input information to instruct the filter module 206 on how to respond after an advertisement is skipped. In an exemplary embodiment, the user interface module 210 may present three options in the graphical user interface 400. A first option may instruct the set top box 102 to rewind a skipped media segment when an action key is pressed. The filter module 206 may examine the pointers of the media table associated with the media segment to identify a beginning of the skipped media segment stored in the media database module 204 and may output the filtered media stream beginning at the skipped media segment.

By selecting the second option, the viewer may identify false positives based on pressing an action key to send a false positive signal to the set top box 102 to mark a skipped media segment as being a false positive. Marking the skipped media as a false positive may indicate that the filter module 206 improperly did not identify a media segment as an advertisement media segment. Once the false positive signal is received, the filter module 206 may examine the pointers of the media table associated with the media segment to identify and skip to an ending of the media segment in the filtered media stream. The filter module 206 may output the filtered media stream beginning at the next media segment.

The third option may permit the viewer to instruct the filter module 206 to learn from feedback signals for manual rewinds and/or identifying false positives. If the option for learning from rewinds and/or false positives is selected, the filter module 206 may update the media table module 208 when the set top box 102 receives a feedback signal from the user input device. For feedback signals requesting a rewind, the update to the media table module 208 may store a media segment I.D. for the skipped media segment indicating that the skipped media segment is not an advertisement media segment. Updating the media table module 208 may prevent the filter module 206 from removing future instances of the skipped media segment from the media stream. The update to the media table module 208 also may prevent the filter module 206 from removing media segments having characteristics similar to those of the skipped media segment.

For feedback signals identifying false positives, the user interface module 210 may update the media table module 208 to identify the media segment as being an advertisement media segment. Updating the media table module 208 may permit the filter module 206 to remove future instances of the media segment from the media stream. The filter module 206 also may remove media segments having similar characteristics as that of the media segment based on the updated media table module 208.

Figure 5:
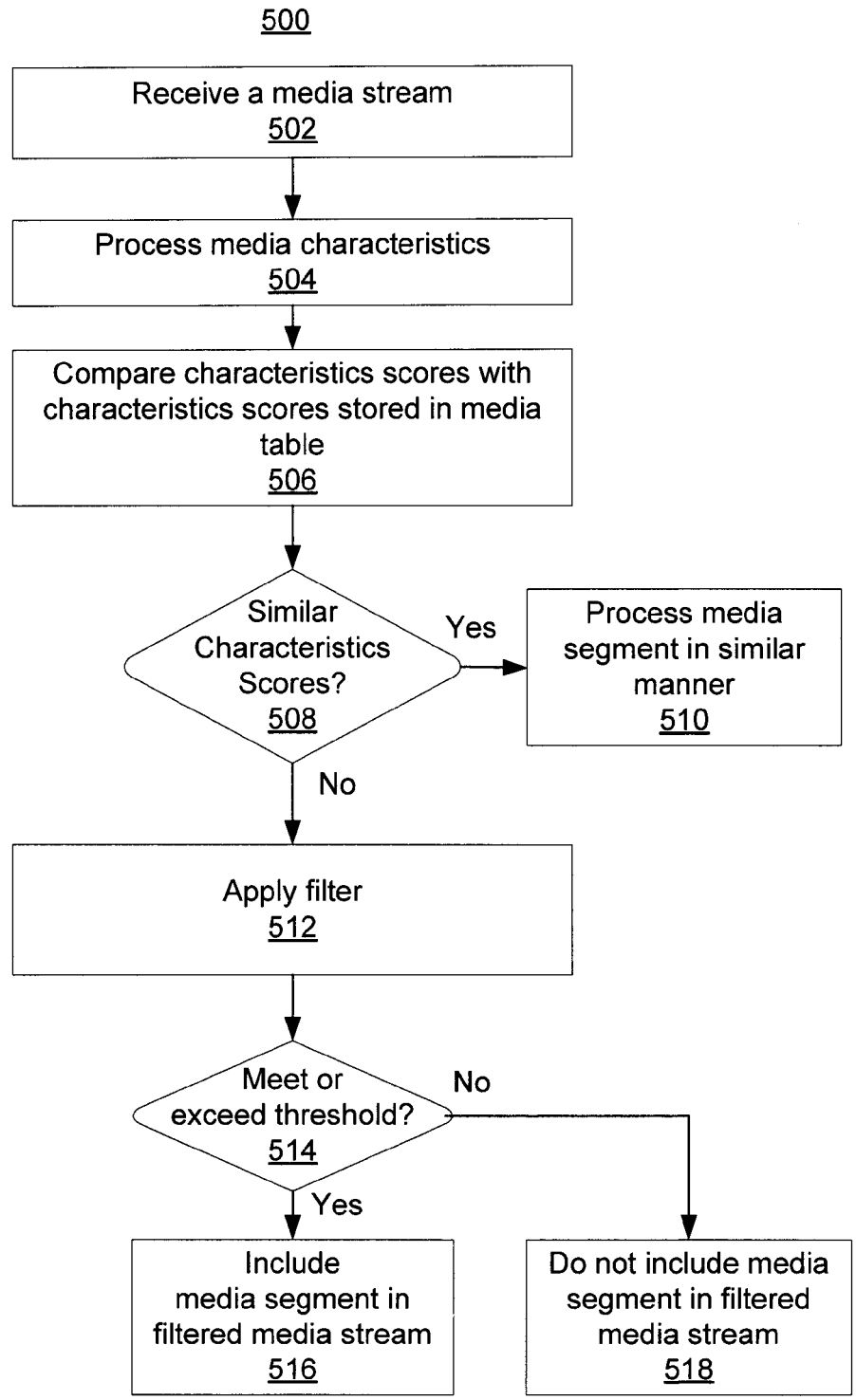
FIG. 5 illustrates a flow diagram of a method for filtering a media stream in accordance with exemplary embodiments.

FIG. 5 illustrates a flow diagram of a method for filtering a media stream in accordance with exemplary embodiments. This exemplary method is provided by way of example, as there are a variety of ways to carry out methods disclosed herein. The method 500 shown in FIG. 5 can be executed or otherwise performed by one or a combination of various systems. The method 500 is described below as carried out by the system 100 shown in FIG. 1 by way of example, and various elements of the system 100 are referenced in explaining the example method of FIG. 5. Each block shown in FIG. 5 represents one or more processes, methods, or subroutines carried in the exemplary method 500. Referring to FIG. 5, the exemplary method 500 may begin at block 502.

In block 502, the set top box 102 may receive a media stream from the media provider 106 via the media delivery network 108. In an exemplary embodiment, a media tracker module 202 of the set top box 102 may receive the media stream via the media delivery network 108. The method 500 may continue to block 504.

In block 504, the media tracker module 202 of the set top box 102 may process characteristics of each media segment included in the received media stream. For example, the media tracker module 202 may process characteristics such as the presence of sound, a call sign, closed captioning text, and/or other characteristics of a media segment. The media tracker module 202 may assign a characteristics score to each characteristic of the media segment. The method 500 may continue to block 506.

In block 506, the filter module 206 of the set top box 102 may receive and may instruct the media table module 208 to compare the characteristics scores of the current media segment with characteristics scores stored in the media table of the previously processed media segments. The method 500 may continue to block 508.

In block 508, if the media table module 208 identifies a previously examined media segment with characteristics scores similar to those of the current media segment, the method 500 may continue to block 510. If the media table module 208 does not identify a previously examined media segment with similar characteristics scores, the method 500 may continue to block 512.

In block 510, the filter module 206 may process the media segment in a manner similar to the processing performed on the previously processed media segment, as indicated by the media table module 208. In an exemplary embodiment, if the media table module 208 indicates that the previously processed media segment was removed from the media stream, the filter module 206 may not include the current media segment in the filtered media stream. If the media table module 208 indicates that the previously processed media segment was not removed from the media stream, the filter module 206 may include the current media segment in the filtered media stream for display at the presentation device 104. This branch of the method 500 may end. Returning to block 508, the method 500 may continue to block 512.

In block 512, the filter module 206 may apply a filter to the media segment. The filter module 206 may apply the filter to generate a media segment score for the media segment based on some or all of the characteristics scores of the media segment. The method 500 may continue to block 514.

In block 514, the filter module 206 may apply the filter to compare the media segment score of the media segment with the threshold specified by the viewer. If the media segment score meets or exceeds the threshold, the method 500 may continue to block 516. If the media segment score does not meet or exceed the threshold, the method 500 may continue to block 518.

In block 516, the filter module 206 may include the media segment in the filtered media stream. The set top box 102 may cause display of the filtered media stream at the presentation device 104. This branch of the method 500 may end. Returning to block 514, the method 500 may continue to block 518.

In block 518, the filter module 206 may remove the media segment and may not include the media segment in the filtered media stream. The set top box 102 may cause display of the filtered media stream at the presentation device 104 without the media segment. This branch of the method 500 may end.

Figure 6:
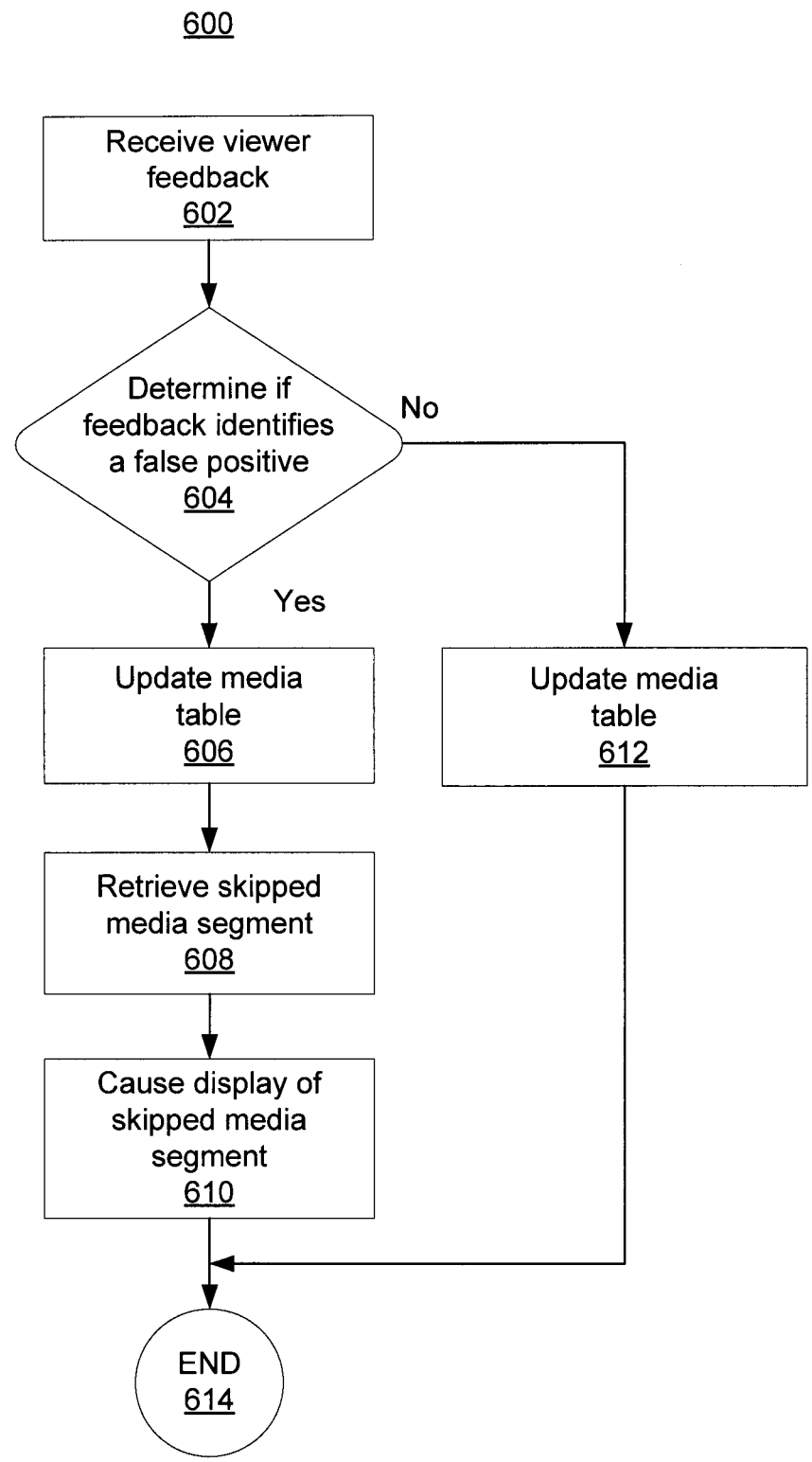
FIG. 6 illustrates a method for processing feedback from a viewer in accordance with exemplary embodiments.

FIG. 6 illustrates a method for processing feedback from a viewer in accordance with exemplary embodiments. This exemplary method is provided by way of example, as there are a variety of ways to carry out methods disclosed herein. The method 600 shown in FIG. 6 can be executed or otherwise performed by one or a combination of various systems. The method 600 is described below as carried out by the system 100 shown in FIG. 1 by way of example, and various elements of the system 100 are referenced in explaining the example method of FIG. 6. Each block shown in FIG. 6 represents one or more processes, methods, or subroutines carried in the exemplary method 600. The method 600 may begin at block 602.

In block 602, the method 600 may include receiving a feedback signal from a user input device associated with a viewer. In an exemplary embodiment, a viewer may use an input device such as, but not limited to, a remote control to generate the feedback signal. The set top box 102 may receive the feedback signal at a receiver module 214, and a user interface module 210 may process the feedback signal. The method 600 may continue to block 604.

In block 604, the user interface module 210 may determine whether the feedback signal identifies a false positive. If the feedback signal identifies a false positive, the method 600 may continue to block 606. If the feedback signal does not identify a false positive, the method 600 may continue to block 612.

In block 606, the user interface module 210 may communicate update information to the media table module 208. The information may update the media I.D., a media segment score and/or the characteristic scores for the media segment being displayed when the receiver module 214 received the feedback signal. The update may indicate that the media segment having those characteristic scores is not an advertisement media segment. In future instances when the filter module 206 encounters a media segment having similar characteristic scores, the filter module 206 may not filter out the media segment from the media stream. The method 600 may continue to block 608.

In block 608, the filter module 206 may retrieve the skipped media segment from the media database module 204 and may output the filtered media stream to the user interface module 210 beginning at the retrieved media segment. The user interface module 210 may output the filtered media stream starting at the previously skipped media segment. The method 600 may continue to block 610.

In block 610, the user interface module 210 may cause display of the filtered media stream at the presentation device 104. The method 600 may continue to block 614 and this branch of the method 600 may end. Returning to block 604, the method 600 may continue to block 612.

In block 612, the user interface module 210 may instruct the media table module 208 to update the media segment score in the media table of the media segment being displayed at the time when the receiver module 214 received the feedback signal. The feedback signal may indicate that the media segment was an advertisement media segment. The update may modify the media segment score and/or the characteristics scores of the media segment such that future instances of the media segment do not meet or exceed the filter and are removed from the media stream by the filter module 206. The method 600 continues to block 614 and ends.

The following provides an example in accordance with exemplary embodiments. In this example, the viewer has set a threshold of forty for the filter. The set top box 102 may receive the media stream via the media delivery network 108. A media tracker module 202 may examine a media segment in the media stream and may output a characteristics score for each of the characteristics of the media segment. In this example, the media tracker module 202 may examine whether each media segment includes a call sign and closed captioning text, and may examine a volume setting for the media segment. The received media segment in this instance does not include a call sign, includes closed captioning text, and the volume setting is at a maximum volume. The media tracker module 202 assigns characteristics scores to each of these characteristics on a scale from zero to ninety nine. The media tracker module 202 examines the media segment and assigns a call sign characteristics score of ninety nine, a closed captioning characteristics score of zero, and a volume setting characteristics score of ninety nine.

The filter module 206 receives the characteristics scores and determines whether a media segment with similar characteristics scores has been previously processed. The filter module 206 may communicate the characteristics scores to the media table module 208, and the media table module 208 indicates that the characteristics scores of the media segment are not similar to any previously processed media segments.

The filter module 206 applies a filter to generate a media segment score for the media segment based on the characteristics scores. In this example, the filter equally weights each of the characteristics scores and generates a media segment score of sixty six for the media segment. The filter module 206 may use a numerical comparison between the media segment score and the threshold to determine whether the media segment score meets or exceeds the threshold. In this example, media segment scores that meet or exceed the threshold are those having scores less than or equal to the threshold. The filter module 206 determines that the media segment score of the media segment being processed is greater than the threshold, and hence does not meet or exceed the threshold. The filter module 206 predicts that the media segment is an advertisement media segment, and does not include the media segment in the filtered media stream. The filter module 206 then communicates the filtered media stream to the user interface module 210, and the user interface module 210 outputs the filtered media stream to cause display of the filtered media stream at the presentation device 104.

The viewer, who is watching the filtered media stream at the presentation device 104, realizes that the set top box 102 should not have skipped the media segment. The viewer presses an action key on a user input device to communicate a feedback signal to the set top box 102. The feedback signal indicates that the media segment should not have been skipped. The receiver module 214 may receive the feedback signal and may communicate the feedback signal to the user interface module 210. The user interface module 210 may update the media table module 208 based on the feedback signal such that future instances of the media segment are not removed from the media stream.

The filter module 206 also may retrieve the removed media segment from the media database module 204 and may include the media segment in the filtered media stream. The filter module 206 may communicate the filtered media stream beginning at the skipped media segment and the user interface module 210 may cause display of the filtered media stream at the presentation device 104.

Thus, the system in accordance with exemplary embodiments may filter a media stream to remove media segments that do not meet or exceed a threshold. Filtering of the media stream may remove media segments that are predicted to be advertisement media segments based on the characteristics of the media segment. The system also may receive information from the viewer to update the filter to adjust which media segments are removed by the filter.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:
receiving a live media stream;
receiving, from a user, a selection to pause the received live media stream, wherein the selection enables program filtering of the received live media stream while the received live media stream is paused;
receiving at least a portion of the received live media stream via a media delivery network;
processing a plurality of characteristics of media segments of the received live media stream, wherein the plurality of characteristics comprises one or more characteristics not based on metadata included in the received live media stream;
assigning a characteristics score to each of the plurality of characteristics;
comparing the assigned characteristics score with previously examined characteristics scores, wherein each of the previously examined characteristics scores are associated with one or more previously processed media segments;
determining whether the assigned characteristics score corresponds to at least one of the previously examined characteristics scores, based on the comparison;
upon determining that the assigned characteristics score does not correspond to at least one of the previously examined characteristics scores, creating a filtered live media stream by applying a filter to the media segment, based on the received selection that enabled program filtering, to generate a media segment score based on a formula that applies numerical weights to the assigned characteristics scores and to compare the media segment score with a threshold, wherein the filtering of the paused received live media stream comprises removing the media segment from the paused received live media stream upon the media segment score not meeting or exceeding the threshold;
outputting the filtered live media stream from the filter for displaying or recoding of the filtered live media stream.

2. The method of claim 1, wherein the media segment score indicates a prediction of whether the media segment is an advertisement media segment.

3. The method of claim 1, wherein one of the characteristics scores indicates whether a blank media segment preceded the media segment.

4. The method of claim 1, wherein one of the characteristics scores indicates whether the media segment includes a call sign.

5. The method of claim 1, wherein one of the characteristics scores indicates whether the media segment includes closed captioning (CC) text.

6. The method of claim 1, wherein one of the characteristics scores indicates audio traits of the media segment.

7. The method of claim 1, wherein one of the characteristics scores indicates video traits of the media segment.

8. The method of claim 1, wherein one of the characteristics scores indicates a time elapsed since a previous advertisement media segment.

9. The method of claim 1, wherein one of the characteristics scores indicates whether schedule data from an Electronic Program Guide (EPG) is available.

10. The method of claim 1, further comprising identifying a beginning and an ending of the media segment based on a changes in the characteristics scores.

11. The method of claim 10, further comprising storing pointers indicating the beginning and the ending of the media segment.

12. The method of claim 1, wherein the media segment score is generated based on a formula that applies an equal numerical weighting to the characteristics scores.

13. The method of claim 1, wherein the media segment score is generated based on a formula that applies an unequal numerical weighting to the characteristics scores.

14. The method of claim 1, wherein updating the formula of the filter comprises updating a weighting applied to each of the characteristics scores relative to one another.

15. A non-transitory computer readable media comprising code to perform the acts of the method of claim 1.

16. An apparatus comprising:
a user interface module, the user interface module configured to:
receive, from a user, a selection to pause a received live media stream, wherein the selection enables program filtering of the received lived media stream while the received live media stream is paused; and
a media tracker module communicatively coupled to a network and the user interface module, the media tracker module configured to:
receive the live media stream;
receive at least a portion of the received live media stream via the network, the received live media stream comprising a plurality of received media segments,
examine a plurality of characteristics of a media segment of the plurality of received media segments, wherein the plurality of characteristics comprises one or more characteristics not based on metadata included in the paused media stream, and
assign a characteristics score to each of the plurality of characteristics, and
a filter module communicatively coupled to the media tracker module, the filter module configured to:
compare the assigned characteristics score with previously examined characteristics scores, wherein each of the previously examined characteristics scores are associated with one or more previously processed media segments of the plurality of received media segments, determine whether the assigned characteristics score corresponds to at least one of the previously examined characteristics scores, based on the comparison;

upon determining that the assigned characteristics score does not correspond to at least one of the previously examined characteristics scores, create a filtered live media stream by filtering the media segment, based on the received selection that enabled program filtering, by generating a media segment score based on a formula that applies numerical weights to the assigned characteristics scores and comparing the media segment score with a threshold, wherein the filter module removes the media segment from the paused received live media stream upon the media segment score not meeting or exceeding the threshold.

17. A system comprising:

a processor; and a memory comprising computer-readable instructions which when executed by the processor cause the processor to perform the steps comprising:

receiving a live media stream;

receiving, from a user, a selection to pause the received live media stream, wherein the selection enables program filtering of the received live media stream while the received live media stream is paused;

receiving at least a portion of the received live media stream via a media delivery network, the received live media stream comprising a plurality of received media segments;

processing a plurality of characteristics of media segments of the plurality of received media segments, wherein the plurality of characteristics comprises one or more characteristics based on one or more characteristics not based on metadata included in the received live media stream;

assigning a characteristics score to each of the plurality of characteristics;

comparing the assigned characteristics score with previously examined characteristics scores, wherein the previously examined characteristics scores are associated with one or more previously processed media segments;

determining whether the assigned characteristics score corresponds to at least one of the previously examined characteristics scores, based on the comparison;

upon determining that the assigned characteristics score does not correspond to at least one of the previously examined characteristics scores, creating a filtered live media stream by applying a filter to the media segment, based on the received selection that enabled the program filtering, to generate a media segment score based on a formula that applies numerical weights to the assigned characteristics scores and to compare the media segment score with a threshold, wherein filtering the paused received live media stream removes the media segment from the paused media stream upon the media segment score does not meeting or exceeding the threshold;

outputting the filtered live media stream from the filter for displaying or recording of the filtered live media stream.

\* \* \* \* \*